United States Patent
Yoshimura et al.

(10) Patent No.: US 8,985,667 B2
(45) Date of Patent: Mar. 24, 2015

(54) REAR STRUCTURE OF VEHICLE

(75) Inventors: Kosuke Yoshimura, Tokyo (JP); Masahiro Yoshida, Tokyo (JP); Tsunehisa Nagayoshi, Tokyo (JP); Tomoo Yasuda, Tokyo (JP); Hirokazu Matsui, Tokyo (JP); Norihiko Yoshimine, Tokyo (JP); Hideyasu Nakagami, Tokyo (JP); Akinori Okumura, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/122,654

(22) PCT Filed: May 15, 2012

(86) PCT No.: PCT/JP2012/062411
§ 371 (c)(1), (2), (4) Date: Nov. 26, 2013

(87) PCT Pub. No.: WO2012/169322
PCT Pub. Date: Dec. 13, 2012

(65) Prior Publication Data
US 2014/0077525 A1    Mar. 20, 2014

(30) Foreign Application Priority Data
Jun. 7, 2011  (JP) ................. 2011-127748

(51) Int. Cl.
| | |
|---|---|
| B60J 9/04 | (2006.01) |
| B62D 35/00 | (2006.01) |
| B60Q 1/30 | (2006.01) |
| B60Q 1/44 | (2006.01) |
| B60J 5/10 | (2006.01) |

(52) U.S. Cl.
CPC .............. *B62D 35/00* (2013.01); *B62D 35/007* (2013.01); *B60Q 1/302* (2013.01); *B60Q 1/44* (2013.01); *B60J 5/101* (2013.01)
USPC .......................................... 296/91

(58) Field of Classification Search
CPC ........... B62D 35/00; B62D 25/08; B60J 5/10; B60Q 1/44
USPC ...................... 296/180.1, 91, 146.1; 340/471; 362/493, 496
See application file for complete search history.

(56) References Cited

U.S. PATENT DOCUMENTS

| | | | |
|---|---|---|---|
| 6,637,806 B2 * | 10/2003 | Kazama ................... | 296/180.1 |
| 2003/0071485 A1 | 4/2003 | Kazama | |
| 2006/0214781 A1 * | 9/2006 | Terzian ....................... | 340/471 |
| 2006/0290169 A1 * | 12/2006 | Fukushima et al. ........ | 296/180.1 |

FOREIGN PATENT DOCUMENTS

| | | |
|---|---|---|
| JP | 5-8760 A | 1/1993 |
| JP | 62-177580 U | 1/1993 |
| JP | 5-105123 A | 4/1993 |
| JP | 2002-120769 A | 4/2002 |
| JP | 3516235 B2 | 4/2004 |

* cited by examiner

*Primary Examiner* — Lori L Lyjak
(74) *Attorney, Agent, or Firm* — Birch, Stewart, Kolasch & Birch, LLP

(57) ABSTRACT

A rear structure 1 of a vehicle has a high mounted stop lamp 5 provided at the rear end of a vehicle body. The rear structure is configured such that regions bilaterally outward of a region, where the high mounted stop lamp is installed, on the upper surface of the rear end are inclined more steeply than a reference plane comprising an inclined surface of a roof panel 2, and that the lower surface of the high mounted stop lamp is located above a rearward field of view from the vehicle.

4 Claims, 4 Drawing Sheets

(A)

(B)

REAR STRUCTURE OF VEHICLE

TECHNICAL FIELD

This invention relates to the rear structure of a vehicle.

BACKGROUND ART

There has been a vehicle with a rear spoiler provided at a rear portion thereof. With such a vehicle, a structure has been known in which an upper surface part of the rear spoiler provided to protrude outwardly of the vehicle is a slanted part, and the straightening function of the slanted part forms an optimal stream of air to reduce the air resistance of the vehicle, thereby improving aerodynamic performance (see, for example, Patent Document 1).

PRIOR ART DOCUMENTS

Patent Documents

Patent Document 1: Japanese Patent No. 3516235

SUMMARY OF THE INVENTION

Problems to be Solved by the Invention

Generally, a vehicle has a stop lamp installed in its rear portion for informing a succeeding vehicle of a brake being applied to the vehicle. In recent years, in particular, a high mounted stop lamp has frequently been mounted near the upper end side of a rear window in the rear portion of the vehicle along the upper end side of the rear window. When the high mounted stop lamp is provided on a rear gate, without the aforementioned rear spoiler being provided, the position of installation of the high mounted stop lamp lowers, if an upper surface part of the high mounted stop lamp on the rear gate is inclined downward in order to improve aerodynamic performance. This poses the problem of impairing a driver's rearward visibility, potentially bringing about undesirable results. Such a problem is not limited to the provision of the high mounted stop lamp on the rear gate, but it is a problem in common with direct provision of the high mounted stop lamp, without provision of the rear spoiler, in a rear surface portion of the vehicle.

A challenge to the present invention is to solve the problems of the conventional technology. It is an object of the present invention to provide a rear structure of a vehicle which enables a high mounted stop lamp to be provided in a rear surface portion of the vehicle, while improving aerodynamic performance.

Means for Solving the Problems

The rear structure of a vehicle according to the present invention is a rear structure of a vehicle having a high mounted stop lamp provided at the rear end of a vehicle body, wherein regions bilaterally outward of a region, where the high mounted stop lamp is installed, on the upper surface of the rear end are inclined more steeply than a reference plane comprising the inclined surface of a roof panel, and the lower surface of the high mounted stop lamp is located above the rear field of view from the vehicle. Since the lower surface of the high mounted stop lamp is located above the rear field of view from the vehicle, the driver's rearward visibility is not obstructed. Moreover, the regions bilaterally outward of the region, where the high mounted stop lamp is installed, are inclined more steeply than the reference plane comprising the inclined surface of the roof panel. Thus, aerodynamic performance can be improved.

In a preferred embodiment of the present invention, the rear structure has an openable and closable rear gate which opens and closes an opening in the rear portion of the vehicle, and the high mounted stop lamp is provided at the upper end of the rear gate.

It is preferred for a junction between the upper surface of the vehicle body and a rear surface portion of the vehicle body to have an angled section. Because of this feature, a separation point is stably formed, so that aerodynamic performance can be improved.

Effects of the Invention

According to the rear structure of a vehicle of the present invention, it becomes possible to exhibit the excellent effects that the high mounted stop lamp can be provided on the rear gate, with aerodynamic performance being improved.

BRIEF DESCRIPTION OF THE DRAWINGS

FIGS. 3(A) and 3(B) are views for illustrating the rear structure of the vehicle according to the present embodiment, in which FIG. 3(A) is a schematic sectional view taken on line A-A in FIG. 2, and FIG. 3(B) is a schematic sectional view taken on line B-B in FIG. 2.

FIGS. 4(A) and 4(B) are views for illustrating the rear structure of the vehicle according to the present embodiment, in which FIG. 4(A) is a schematic view focusing on a central upper surface part, and FIG. 4(B) is a schematic view focusing on a recess.

MODE FOR CARRYING OUT THE INVENTION

The rear structure of a vehicle according to the present embodiment will now be described using FIG. 1 to FIGS. 4(A), 4(B).

Figure 1:
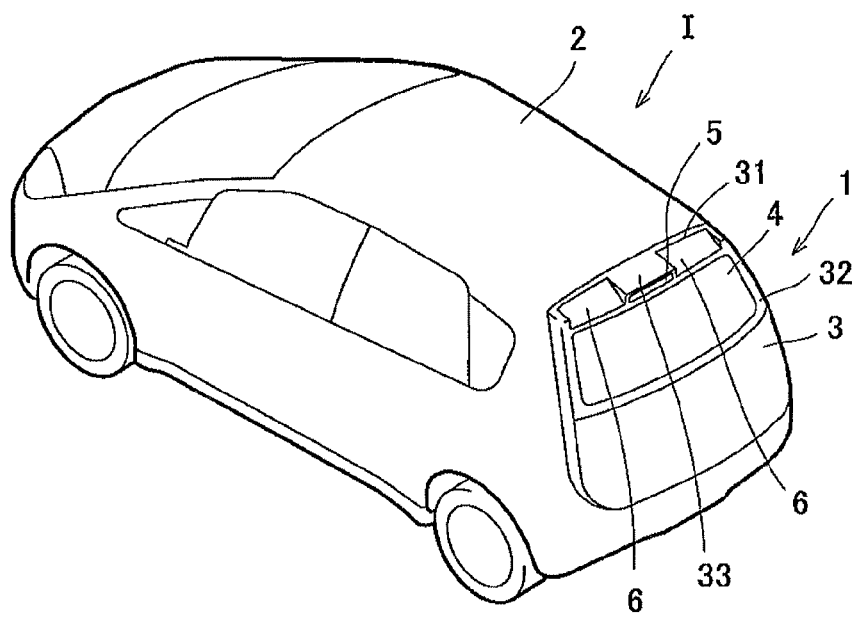
FIG. 1 is a schematic perspective view of a vehicle for illustrating the rear structure of the vehicle according to the present embodiment.
Figure 2:
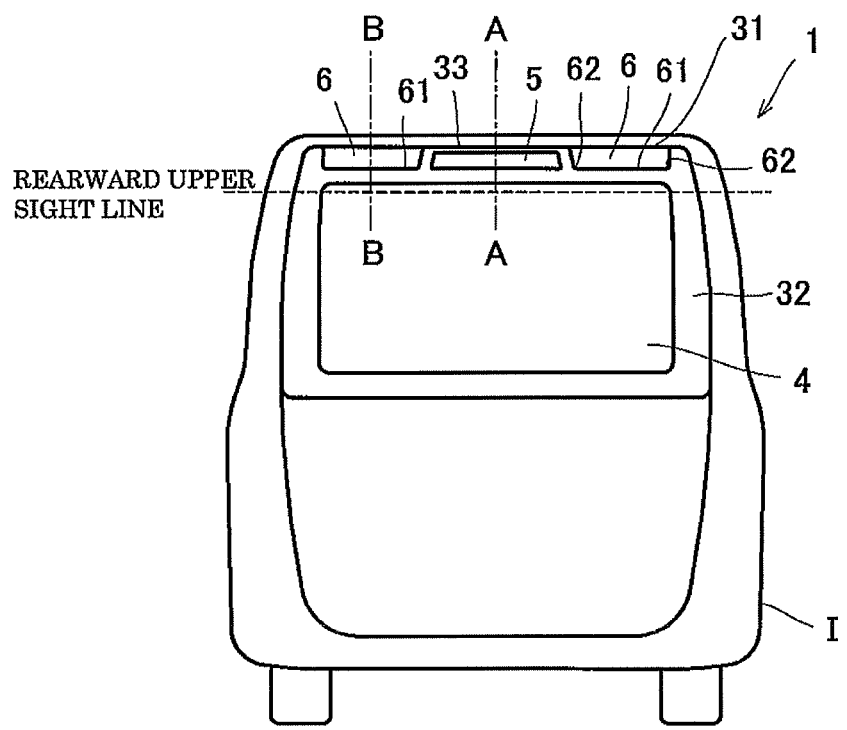
FIG. 2 is a schematic rear view of the vehicle for illustrating the rear structure of the vehicle according to the present embodiment.
Figure 3:
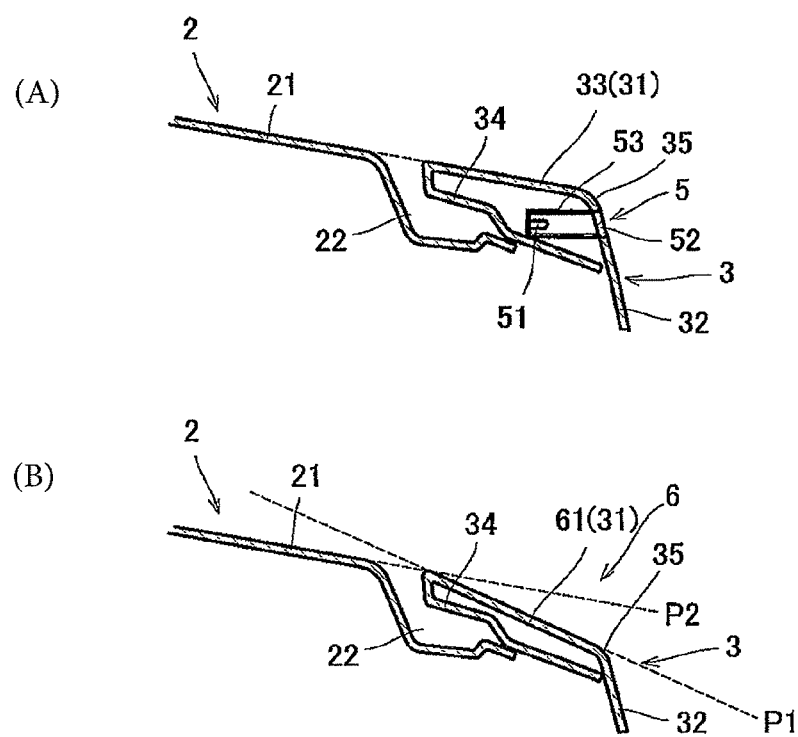
Figure 4:
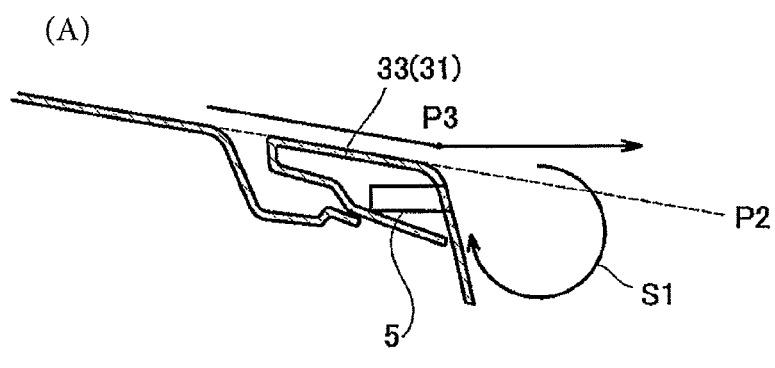
Figure 4:
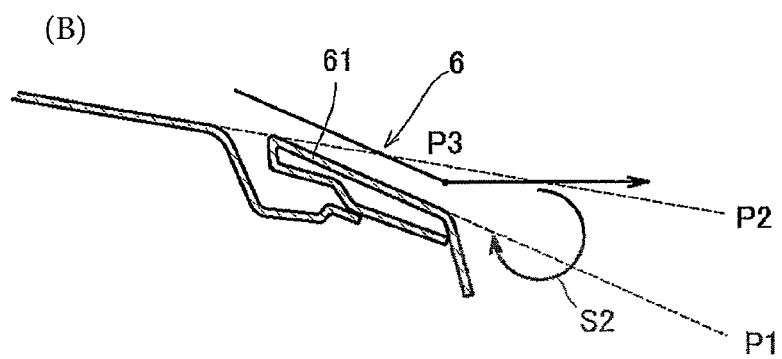

As shown in FIG. 1, a rear portion of the vehicle body of a vehicle I according to the present embodiment is given a rear structure 1 of a vehicle. A rear gate 3 is provided at the rear end of a roof panel 2 of the vehicle I. The rear gate 3 is composed of a rear upper surface section 31 constituting the top portion of the vehicle together with the roof panel 2, and a rear posterior surface section 32 provided to be continuous with the rear upper surface section 31 and constituting the rear surface portion of the vehicle. The rear upper surface section 31 is inclined downwardly in the vehicle body from the front toward the back of the vehicle body. In the present embodiment, a high mounted stop lamp 5 is incorporated in a middle part, beside the upper end, of the rear posterior surface section 32. A rear window 4 is provided in the middle of the rear posterior surface section 32. The rear window 4, as shown in FIG. 2, is provided to extend from above a rearward upper sight line, which shows the upper line of a driver's rearward field of view, to the lower side of the vehicle body. The driver's rearward field of view, as used herein, refers to the rearward field of view from the driver's seat, and the upper line refers to the line of the upper boundary of rearward field of view at the rear end of the vehicle. It is to be noted that since the driver's field of view changes with the driver's height, the driver's field of view herein means the general hypothetical field of view the driver would have.

The rear upper surface section 31 has a central upper surface part 33 where the high mounted stop lamp 5 is provided. The central upper surface part 33, as shown in FIG. 3(B), is provided to have the same or virtually the same inclination as that of a rear end sloped surface 21 constituting the rear end of the roof panel 2 when the rear gate 3 is in a closed state.

An upper side section of the rear gate 3 is pivotably supported, via a hinge member (not shown), by a roof panel concavity 22 provided at the end of the rear end sloped surface 21 of the roof panel 2.

The high mounted stop lamp 5 is specifically composed of a light emitting diode 51, a red lens plate 52, and a housing 53 accommodating them etc. The high mounted stop lamp 5 in installed by a publicly known method in such a manner that the red lens plate 52 is fitted into the rear posterior surface section 32 and exposed on the posterior surface of the vehicle.

As shown in FIG. 2, recesses 6 for improving aerodynamic performance are formed on the end sides, in the width direction of the vehicle body, of the rear upper surface section 31 of the rear gate 3, namely, on both outer sides of the high mounted stop lamp 5. As shown in FIG. 3(B), the recesses 6 are each provided so as to be inclined downwardly in the vehicle body more steeply than a reference plane P2 as a sloped surface comprising the rear end sloped surface 21 of the roof panel 2. That is, the recess 6 has an inclined surface 61 which is inclined downwardly in the vehicle body as compared with the inclination of the central upper surface part 33. The rear upper surface section 31 is composed of the above-mentioned central upper surface part 33 and these inclined surfaces 61. The inclined surface 61 is provided to extend along an optimized plane P1 for optimizing the aerodynamic performance of the vehicle for improvement. In the present embodiment, the inclined surface 61 is formed to be inclined downwardly by a dimension of the order of 5 mm or more, at an angle of 2 to 10 degrees, with respect to the central upper surface part 33 (rear end sloped surface 21), whereby the inclined surface 61 extends along the optimized plane P1 effective for aerodynamic performance. The inclined surface 61 continues into the rear posterior surface section 32. Since the inclined surfaces 61 are formed in the rear upper surface section 31 of the rear gate 3, as noted above, aerodynamic performance can be improved in the present embodiment.

The aerodynamic performance will be described. In FIG. 4(A) corresponding to FIG. 3(A), a surface comprising the rear upper surface section 31 at the position, where the high mounted stop lamp 5 is provided, extends along the reference plane P2 constituted by the rear end sloped surface 21 of the roof panel 2. In this case, a vortex of air (separation vortex) S1 formed downstream of the rear structure of the vehicle during travel of the vehicle assumes a form as in FIG. 4(A). That is, a stream of air flows along the central upper surface part 33, and separates at a separation point P3 downstream of the end of the central upper surface part 33, forming the separation vortex S1 on the downstream side of the rear structure 1 of the vehicle.

On the other hand, the inclined surface 61 at the position, where the recess 6 shown in FIG. 4(B) corresponding to FIG. 3(B) is provided, extends along the optimized plane P1 having a greater (steeper) inclination than the reference plane P2. With such inclined surface 61, a vortex of air (separation vortex) S2 formed behind the vehicle while running is smaller than the separation vortex S1. By so forming the separation vortex S2 smaller than the separation vortex S1, air resistance can be decreased.

Assume that at the position where the high mounted stop lamp 5 of the rear gate 3 is provided, the rear upper surface section 31 is provided to extend along the optimized plane P1. In this case, the position of the high mounted stop lamp 5 will become lower than the rearward upper sight line, and there may be an impediment to the rearward upper sight line. With the present embodiment, therefore, the rear upper surface section 31 is provided to extend along the reference plane P2, at the position where the high mounted stop lamp 5 is provided. By so doing, the rear window 4 can be provided, beginning at a site above the rearward upper sight line, so that the field of vision can be ensured. If the entire rear surface is formed in this state, on the other hand, aerodynamic performance will be poor. Thus, the recesses 6 are provided on both sides of the high mounted stop lamp 5, and these recesses 6 are provided to extend along the optimized plane P1. By this measure, the rear structure 1 of the vehicle is configured, as a whole, to keep aerodynamic performance high.

In the present embodiment, as described above, the high mounted stop lamp 5 is provided without an impediment to the rearward field of view. Moreover, the recesses 6 having the inclined surfaces 61 along the optimized plane P1 are provided at both ends of the high mounted stop lamp 5. As a result, the formation of the separation vortex is suppressed to improve aerodynamic performance.

If, in this case, the inclination of the inclined surface 61 is too great, there arises, for example, a difference between the inclination angle of the sloped surface at the rear end of the roof panel 2 and the inclination angle of the inclined surface 61. Thus, separation of the air stream occurs to deteriorate aerodynamic performance. In the present embodiment, therefore, the angle of the inclined surface 61 is inclined to such a degree as not to cause the separation of the air stream; that is, this angle is inclined such that the inclined surface 61 extends along the optimized plane P1, thereby achieving optimization.

Incidentally, it is conceivable, for example, to provide the high mounted stop lamp 5 on a rear spoiler, separately from the rear gate, and render the upper surface of the rear spoiler inclined in the same manner as is the inclined surface 61. In this case, however, the rear spoiler is formed separately from the rear gate. Thus, there are possibilities that a stream of air cannot flow smoothly between the rear gate and the rear spoiler, with the result that many separation points will be formed, leading to a decline in aerodynamic performance. Since the rear spoiler is formed as a separate object, moreover, the design of the vehicle is affected, and the number of the components is increased to increase the manufacturing cost. Furthermore, aerodynamic performance improves only at the location where the high mounted stop lamp 5 is provided, the location that does not necessarily occupy a large area in the width direction of the vehicle. It is likely, therefore, that the aerodynamic performance of the vehicle itself will become lower than that of the vehicle of the present embodiment. Hence, it is preferred to form the rear structure of the vehicle as in the present embodiment.

According to the present embodiment, as shown in FIG. 3(B), the continuous inclined surface 61 and the rear posterior surface section 32 are smoothly connected, not in such a manner as to form a rounded junction, namely, as to form a greatly arcuate junction, but in such a manner as to form an angled section 35. Since the angled section 35 is thus formed, the separation point P3 (see FIGS. 4(A), 4(B)) for the air stream is formed stably, instead of many of the separation points P3 being formed unstably, during travel of the vehicle. In detail, if the junction is of a rounded shape, a plurality of separation points will be formed unstably, in the longitudinal direction of the vehicle, at the rear end of the vehicle. By contrast, the junction, i.e., the extreme end of the vehicle, forms the angled section. Thus, the separation point P3 is formed stably, in the longitudinal direction of the vehicle, at the rear end of the vehicle, whereby the vortex of air, S2, can be formed in a smaller size. Consequently, a negative pressure occurring behind the vehicle can be reduced to decrease air resistance.

In order to avoid the formation of many such separation points, according to the present embodiment, the ends 62 (see FIG. 2) of the recesses 6 in the width direction of the vehicle body are also formed to have angled sections.

With the vehicle I in the present embodiment, as described above, aerodynamic performance is improved, and the driver's rearward field of view is not impaired.

The vehicle I according to the present embodiment has the rear gate, but the vehicle need not have the rear gate. The recesses 6 may be formed in an upper surface portion of an outer panel constituting the rear end of the vehicle.

EXPLANATIONS OF LETTERS OR NUMERALS

1 Rear structure
2 Roof panel
3 Rear gate
4 Rear window
5 High mounted stop lamp
6 Recess
21 Rear end sloped surface
22 Roof panel concavity
31 Rear upper surface section
32 Rear posterior surface section
33 Central upper surface part
34 Junction
35 Angled section
51 Light emitting diode
52 Red lens plate
53 Housing
61 Inclined surface
62 End
P1 Optimized plane
P2 Reference plane
P3 Separation point
S1 Vortex of air
S2 Vortex of air
I Vehicle

The invention claimed is:

1. A rear structure of a vehicle comprising:
a high mounted stop lamp provided at a rear end of the vehicle,
wherein regions bilaterally outward of a region, where the high mounted stop lamp provided in a central upper surface part of the rear end is installed, have inclined surfaces inclined more steeply than a reference plane extending along a surface of a roof panel,
wherein the inclined surfaces formed in the regions bilaterally outward of the region, where the high mounted stop lamp is installed, form recesses ends, in a width direction of the vehicle, of the recesses have angled sections, and
wherein ends, in a width direction of the vehicle, of the recesses have angled sections.

2. The rear structure of a vehicle according to claim 1, further comprising:
an openable and closable rear gate which opens and closes an opening in a rear portion of the vehicle,
wherein the high mounted stop lamp is provided at an upper end of the rear gate.

3. The rear structure of a vehicle according to claim 1, wherein
a junction between an upper surface of the vehicle and a rear surface portion of the vehicle has an angled section.

4. The rear structure of a vehicle according to claim 2, wherein
a junction between an upper surface of the vehicle and a rear surface portion of the vehicle has an angled section.

* * * * *